United States Patent [19]

Uchiyama et al.

[11] 4,239,094
[45] Dec. 16, 1980

[54] CURRENT TRANSMITTING SYSTEM FOR TRACKWAY TYPE MOTOR VEHICLE

[75] Inventors: Hiromichi Uchiyama, Yokosuka; Eiichi Yaguchi, Yokohama; Akira Nakamura; Yoshio Maeda, both of Osaka; Susumu Watabe, Tokyo, all of Japan

[73] Assignees: Nissan Motor Company, Limited, Yokohama; Sumiyomo Electric Industries, Limited, Osaka, both of Japan

[21] Appl. No.: 1,351

[22] Filed: Jan. 3, 1979

[51] Int. Cl.³ .............................................. B60M 1/34
[52] U.S. Cl. ....................................... 191/25; 191/31; 191/48
[58] Field of Search ........................ 191/25, 30, 31, 35, 191/49, 48

[56] References Cited

U.S. PATENT DOCUMENTS

| 405,628 | 6/1889 | Van Depoele | 191/25 |
| 508,083 | 11/1893 | Brain | 191/25 |
| 535,294 | 3/1895 | Murphy | 191/25 |

Primary Examiner—Richard A. Schacher
Attorney, Agent, or Firm—Lowe, King, Price and Becker

[57] ABSTRACT

A bus bar mount on which a current collecting equipment rides comprises an electrically insulating elongate body having a longitudinally extending groove and a longitudinally extending lid hinged to the body proper, a current carrying naked cable set in the groove, and latching means for providing latching engagement of the lid with the body proper to sealingly close the groove when the lid is pressed against the body proper. The current collecting equipment comprises a current collecting shoe, a rod connected to a body of the equipment to forcedly open the lid allowing the shoe to be brought into sliding contact with the naked cable when moved in a direction along the bus bar mount, and a press-roller unit connected to the body of the equipment at the position opposite to the rod with respect to the shoe to press the open lid against the body proper of the mount for providing the latching engagement of the lid with the body proper when moved in the one direction.

32 Claims, 9 Drawing Figures

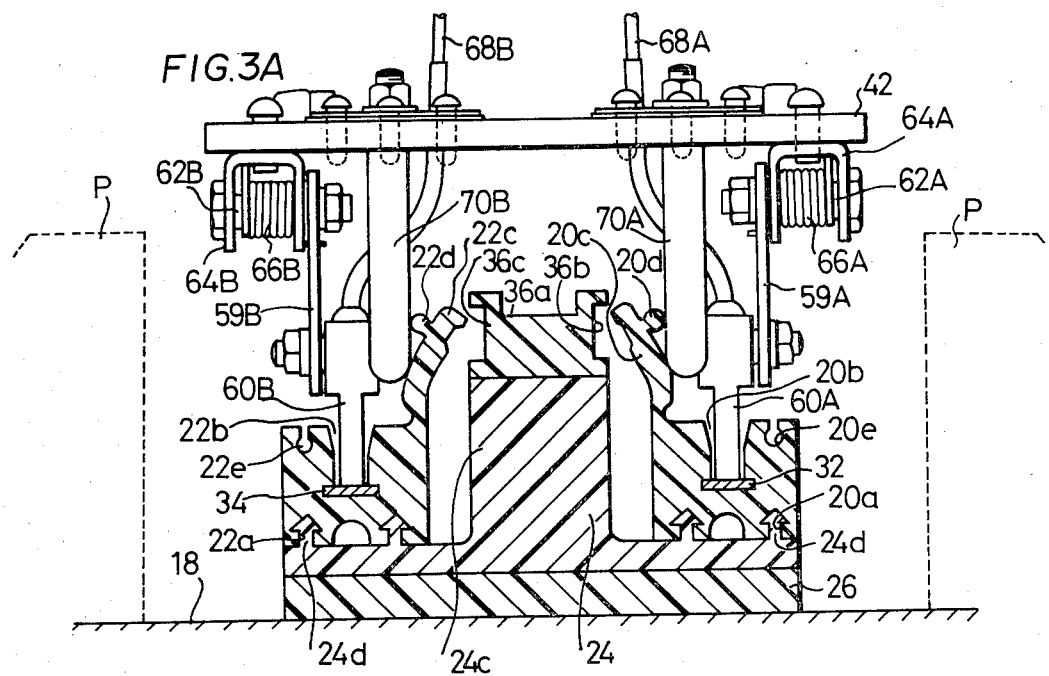
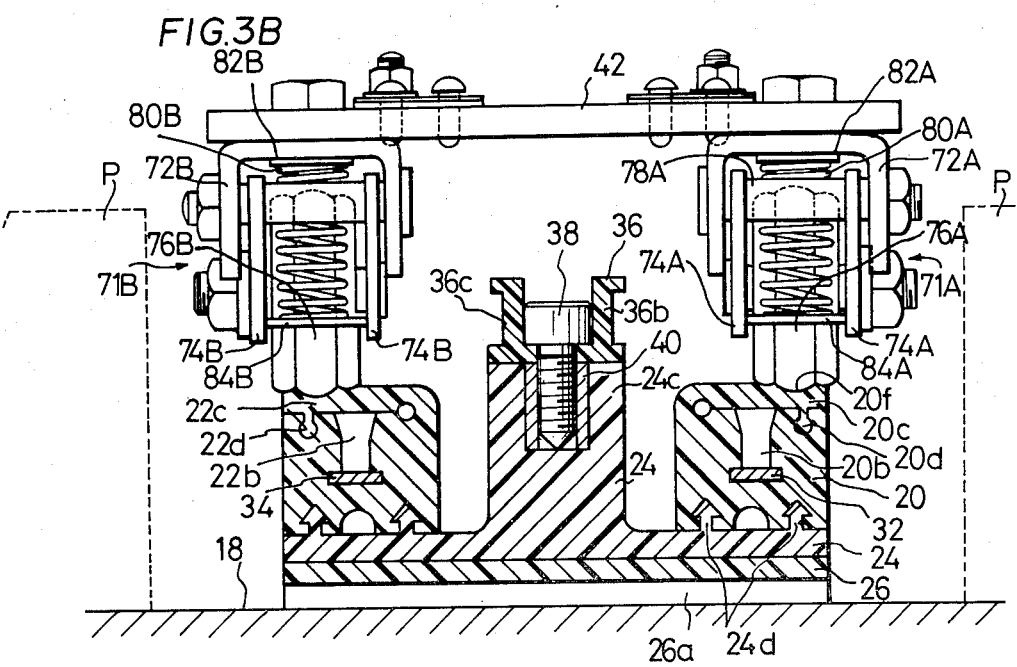

CURRENT TRANSMITTING SYSTEM FOR TRACKWAY TYPE MOTOR VEHICLE

FIELD OF THE INVENTION

The present invention relates in general to a trackway type transportation system which includes a self-propelled vehicle and a trackway on which the vehicle runs by collecting current from current carrying cables or bus bars extending along the trackway, and more particularly to a current transmitting system of the above transportion system for continuously transmitting current from the bus bar to an electric motor of the vehicle.

OBJECT OF THE INVENTION

It is an object of the present invention to provide a new and improved current transmitting system which assures a continuous and reliable electrical connection between a bus bar set in a bus bar mount and an electric motor equipped in a vehicle.

It is another object of the present invention to provide an improved bus bar mount which is constructed to prevent the bus bar in the mount from being attacked by water and dust.

It is still another object of the present invention to provide an improved bus bar mount which is constructed to prevent a man and any object from accidentally touching the bus bar in the mount.

According to the present invention, there is provided a current transmitting system having a bus bar mount and a current collecting equipment which rides on the bus bar mount. The bus bar mount comprises an elongate body constructed of an electrically insulating material. The body has a longitudinally extending groove to which is hinged a longitudinally extending lid. A proper, a current carrying naked cable is fixedly received in the groove. Latching means provides latching engagement of the lid with the body to sealingly close the groove when the lid is pressed against the body proper. The current collecting equipment includes a current collecting shoe. A lid opening device, when moved in one direction along the bus bar mount, forcedly opens the lid to allow the shoe to be in sliding contact with the naked cable. A lid closing device, when moved in the one direction presses the opened lid against the body proper to provide the latching engagement of the lid with the body proper.

SUMMARY OF THE DRAWINGS

Other objects and advantages of the present invention will become clear from the following description when taken in conjunction with the accompanying drawings, in which:

FIGS. 3A and 3B are sectional views taken along the lines A—A and B—B of FIG. 1, respectively;

DESCRIPTION OF THE EMBODIMENTS

Figure 1:
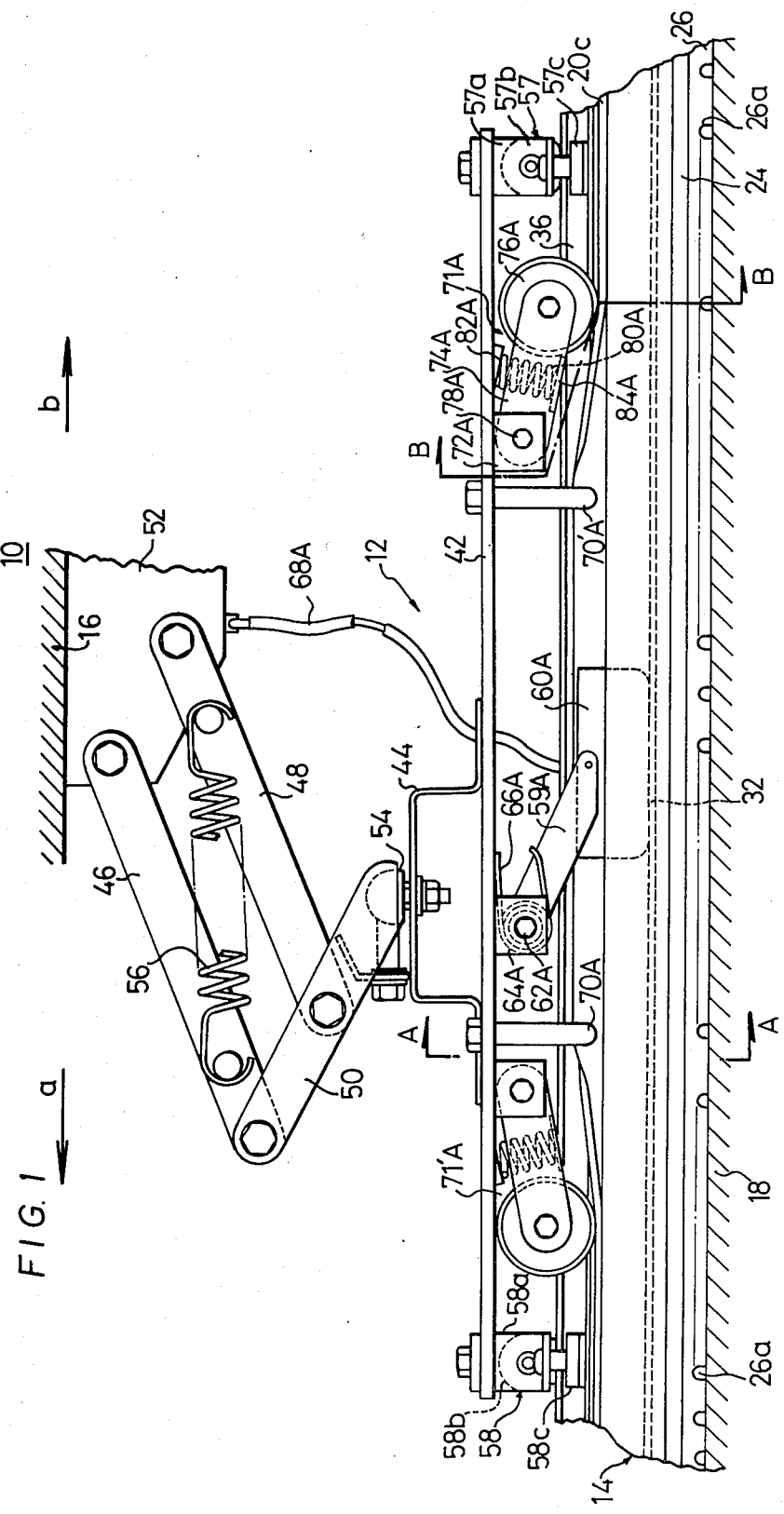
FIG. 1 is a side view of a current transmitting system of the present invention, showing a current collecting equipment connected to a lower part of the self-propelled vehicle and a bus bar mount on which the current collecting equipment rides.

Referring to FIG. 1 of the drawings, there is illustrated a current transmitting system 10 of the present invention. The system 10 generally comprises a current collecting equipment 12 swingably connected to a lower section of a self-propelled vehicle 16, and a bus bar mount 14 on which the current collecting equipment 12 rides, the bus bar mount 14 being placed on a rod surface 18. Although not shown in the drawings, suitable numbers of wheels are operatively fixed to the vehicle 16 for running the vehicle 16 on rails (not shown) which lie on the road surface 18 along the bus bar mount 14.

Figure 2:
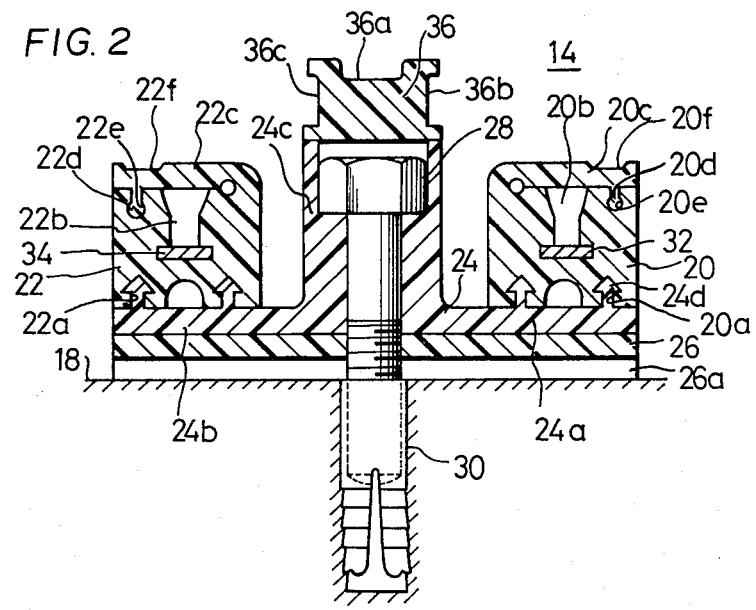
FIG. 2 is a sectional view of the bus bar mount which has a pair of bus bars therein and a guide rail thereon.

As is best shown in FIG. 2, the bus bar mount 14 comprises a pair of bus bar containers 20 and 22 which are constructed of a flexible electric insulating material such as a flexible polyvinyl chloride (PVC). The containers 20 and 22 are secured to respective flange sections 24a and 24b of a stand member 24 which is constructed of a rigid electric insulating material such as a rigid polyvinyl chloride. As shown, the containers 20 and 22 on the flanges 24a and 24b are arranged substantially symmetrically with respect to a central ridge portion 24c of the stand member 24. The secure connection of the containers 20 and 22 to the flanges 24a and 24b is made by latchably squeezing longitudinally extending projections 24d (only one is designated) formed on the flanges 24a and 24b into longitudinally extending grooves 20a and 22a formed in the containers 20 and 22, in a snap action manner. For this, each projection 24d has an enlarged head, as shown.

The stand member 24 is attached via a height adjusting plate 26 to the road surface 18 by screwing bolts 28 equally spacedly arranged in the stand member 24 into threaded bores (no numerals) of anchor rings 30 which are fixedly secured in the ground below ground level. The height adjusting plate 26 is made of a flexible material such as a rubber plate. In the disclosed embodiment, a suitable number of grooves 26a are transversely formed in the lower section of the plate 26, as is best seen in FIG. 1, for improving flexibility of the same.

Containers 20 and 22 respectively have a longitudinally extending slots or grooves 20b and 22b within which a bus bar or current carrying naked cable 32 and 34 are fixedly disposed. Preferably, each of slots 20b and 22b is slightly enlarged at the entrance thereof, as shown. Containers 20 and 22 respectively have longitudinally extending lid portions 20c and 22c, having a hinged portion at the inside shoulder portion of its associated container 20 or 22. As shown, each lid portion 20c and 22c has a sufficient width to cover the corresponding slot 20b and 22b. The lid portions 20c and 22c are respectively formed at the leading ends thereof with longitudinally extending ridges 20d and 22d each having an enlarged Ω-shaped head (no numeral). The ridges 20d and 22d are latchably received in longitudinally extending grooves 20e and 22e formed in main portions of the containers 20 and 22 when the lid portions 20c and 22c are pessed against the main portions. For assurance of the latching, each of grooves 20e and 22e is formed so at the bottom thereof there is an enlarged Ω-shaped section, as shown. If desired, the enlarged section may be formed into a wedge construction and/or any polygonal construction. For the reason which will be apparent hereinafter, each lid portion 20c and 22c is formed at the upper section thereof, preferably at the back side of the corresponding ridge 20d and 22d, with a longitudinally extending but shallow groove 20f and 22f.

A guide rail 36 having a generally rectangular cross section is mounted on and secured to the top of the central ridge portion 24c of the stand member 24. For this purpose, a suitable member of bolts 38 (see FIG. 3B) set in holes (no numerals) formed in the rail 36 are screwed into nuts 40 which are tightly held in holes (no numerals) in the central ridge portion 24c of the stand member 24. The rail 36 is constructed of rigid plastic such as a rigid polyvinyl chloride (PVC) and has at the upper section thereof a flat groove 36a (FIG. 3A) and at the side sections thereof two flat grooves 36b and 36c, each groove extending longitudinally along the rail 36.

Figure 4:
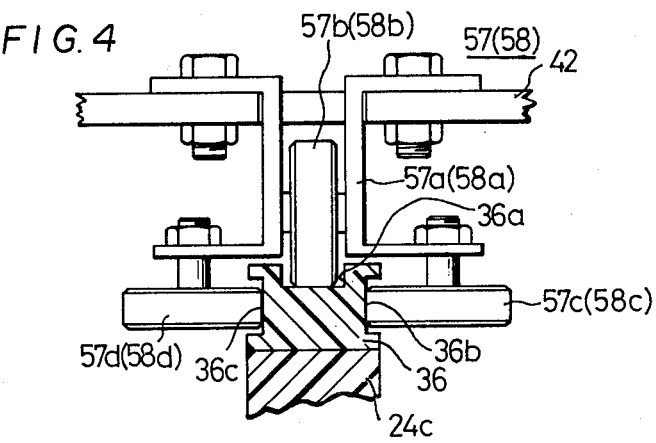
FIG. 4 is a sectional view of a guide roller unit mounted to the current collecting device, wherein the rollers of the unit bear upon the guide rail of the bus bar mount.

Referring to FIGS. 1, 3A and 3B, there is illustrated the current collecting equipment 12 which rides on the aforementioned bus bar mount 14. The current collecting equipment 12 comprises a base plate 42 constructed of an electric insulating rigid material such as a phenol resin plate. As shown in FIG. 1, the base plate 42 has at its generally middle portion a bracket 44 fixed thereof. A link mechanism including three bars 46, 48 and 50 is connected at one end thereof to the bracket 44, via a ball-joint 54 and at the other end to a bracket 52 fixed to the lower section of the self-propelled vehicle 16. a tension spring 56 is connected between and to bars 46 and 48 to bias the base plate 42 toward the bus bar mount 14 so that the link mechanism can function as a shock absorber of the current collecting equipment 12. Guide roller units 57 and 58 are respectively mounted to longitudinal ends of the base plate 42. As is seen in FIG. 4, each of units 57 and 58 respectively comprises a bracket 57a and 58a, a vertical roller 57b and 58b and two horizontal rollers 57c and 57d and 58c and 58d. Rollers 57b, 58b, and 57c, 58c, and 57d, 58d, respectively bear upon the grooves 36a, and 36b and 36c of the guide rail 36, to assure guided running of the current collecting equipment 12 with respect to the bus bar mount 14. Two groups of next-mentioned parts are arranged on the base plate 42 so as to be substantially symmetric with respect to the longitudinal axis of the base plate 42.

For facilitation of the description, the following description of the current collecting equipment 12 is made with respect to the parts of one of the groups, which group is located in a right section of the equipment 12 with respect to the direction of "b" in FIG. 1. The parts of the other group located in a left section of the equipment 12 are substantially the same in construction and configuration as those in the right section. Thus, for ease of understanding and description, the parts located in the right section are indicated by the addition of the letter "A" after each numeral while those in the left section are indicated by the addition of the letter "B" after each corresponding numeral.

As is seen in FIG. 1, an arm 59A having at its lower end a current collecting shoe 60A is pivotally connected at its upper end, via a pivot pin 62A, to a bracket 64A fixed to the lower surface of the base plate 42. The shoe 60A is in sliding contact with the bus bar 32 disposed in the slot 20b of the container 20, as shown in FIG. 3A. A coil spring 66A is disposed about the pivot 62A so as to bias the arm 59A and thus the shoe 60A toward the bus bar 32. A lead wire 68A is connected to the shoe 60A and extends to an electric motor (not shown) mounted in the vehicle 16. A rod 70A is fixed to the base plate 42 near the bracket 64A to extend downwardly. The rod 70A has a sufficient length to hold the lid portion 20c of the container 20 open, as is understood from FIG. 3A. A press-roller unit 71A (FIGS. 1 and 3B) is fixed to the base plate 42 at a position opposite to the rod 70A with respect to the shoe 60A. The unit 71A comprises a bracket 72A fixed to the lower section of the base plate 42. Two parallel arms 74A having at the lower ends thereof a roller 76A are pivotally connected to the bracket 72A via a pivot pin 78A, as is best seen in FIG. 3B. A coil spring 80A is disposed between a spring seat 82A fixed to the base plate 42 and another spring seat 84A fixed to the arms 74A so that arms 74A and thus the roller 76A are biased toward the bus bar mount 14. As is shown in FIG. 3B, the roller 76A is placed or pressed on the lid portion 20c to complete latching engagement of the lid portion 20c with the container 20 proper. In the disclosed embodiment, the roller 76A is constructed to have at the axially middle section thereof a circular raised portion (no numeral) which is to be received in the groove 20f of the lid portion 20c.

Designated by numerals 70'A and 71'A are a rod and a press-roller unit which have generally the same construction and configuration as the rod 70A and the press-roller unit 71A, respectively. The rod 70'A is located between the shoe 60A and the press-roller unit 71A, and the press-roller unit 71'A is positioned between the rod 70A and the guide roller unit 58, as is understood from FIG. 1.

In setting or mounting the current collecting equipment 12 on the bus bar mount 14, the lid portions 20c and 22c of the containers 20 and 22 are partially opened to receive the current collecting shoes 60A and 60B into the corresponding slots 20b and 22b. In this instance, the rods 70A and 70B take positions to hold the lid portions 20c and 22c open by contacting at the top ends with the inner surfaces of the lid portions 20c and 22c, as is shown in FIG. 3A. Further the press-roller units 71A and 71B take positions to press the corresponding lid portions 20c and 22c against the containers 20 and 22 proper to accomplish the latching engagement therebetween, as is shown in FIG. 3B. The setting of the guide roller units 57 and 58 on the guide rail 36 is made by dismantling the units. Upon proper setting or mounting of the current collecting equipment 12 on the bus bar mount 14, the current collecting shoes 60A and 60B are in sliding contact with the bus bars 32 and 34 to provide the electric connection between the bus bars 32 and 34 and the electric motor (not shown) equipped in the vehicle 16.

While the vehicle 16 runs along the rail ways (not shown) with the current collecting equipment 12 in the direction of "a" in FIG. 1, the rods 70A and 70B continuously open the lid portions 20c and 22c of the containers 20 and 22 and the press roller units 71A and 71B continuously close the opened lid portions 20c and 22c. While, when the vehicle 16 runs in the direction of "b" in FIG. 1, the rods 70'A and 70'B open the closed lid portions 20c and 22c and the other press roller units 71'A and 71'B close the opened lid portions 20c and 22c. Thus, it will be appreciated that the bus bar receiving slots or grooves 20b and 22b of containers 20 and 22 are kept closed except small portions where the current collecting equipment 12 is located.

Figure 5:
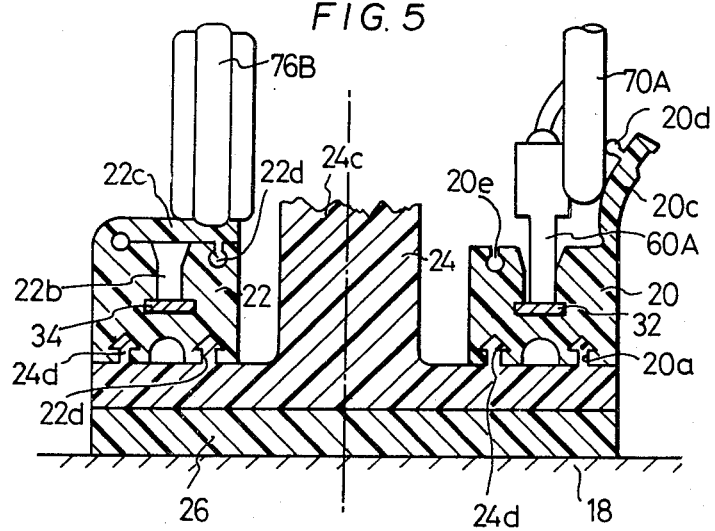
FIG. 5 is a view similar to FIG. 2, but of a modification of the bus bar mount of FIG. 2.
Figure 6:
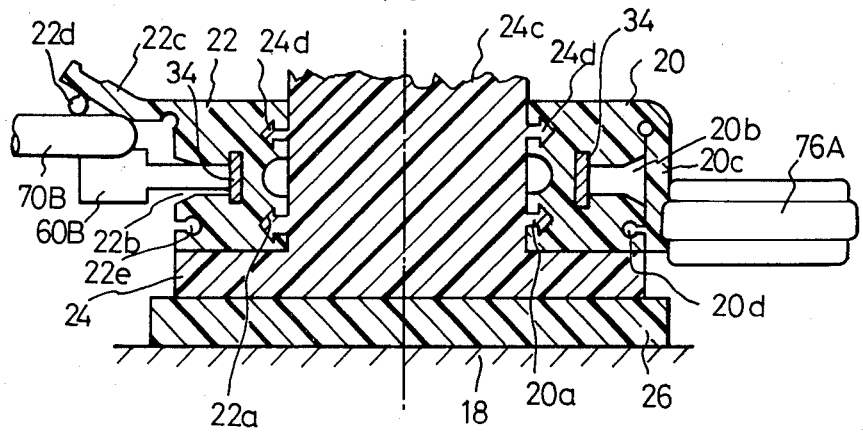
FIG. 6 is a view also similar to FIG. 2, but of another modification of the bus bar mount of FIG. 2.

FIGS. 5 and 6 are respectively illustrations of modifications of the above-mentioned bus bar mount 12. In these figures, the right sections correspond to the right section of FIG. 3A and the left sections are correspond to the left section of FIG. 3B.

In case of FIG. 5, each of the lid portions 20c and 22c extends inwardly from the outside shoulder portion of the corresponding container 20 or 22, as shown.

In FIG. 6, the containers 20 and 22 are secured to side walls of the central ridge portion 24c of the stand member 24 such that the slots 20b and 22b of the containers 20 and 22 face laterally outwardly. To this end, the longitudinally extending projections 24d received in the grooves 20a and 22a of the containers 20 and 22 are formed on the side walls of the central ridge portion 24c. In this case, however, a slight modification in arrangement of the current collecting show assembly, the rods and the pressing roller units with respect to the base plate 42 is necessary to accomplish secured functioning of the current transmitting system.

Figure 7:
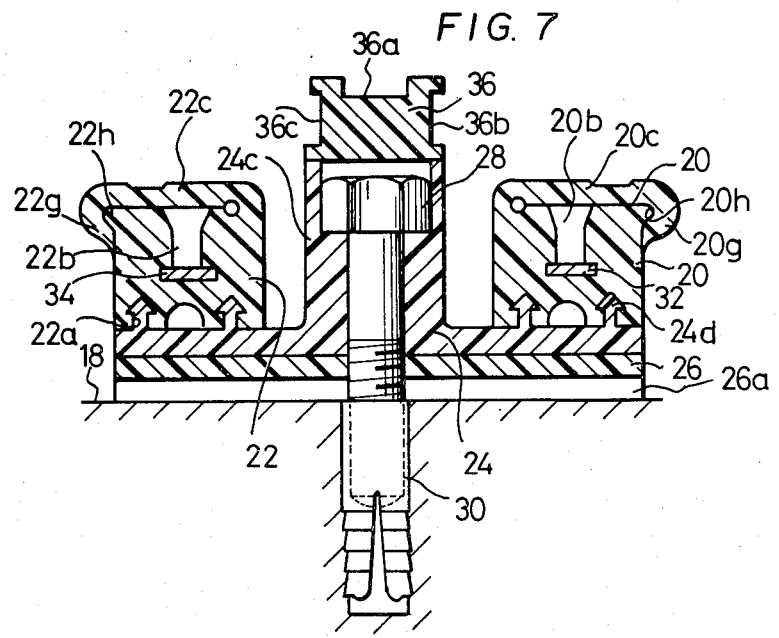
FIG. 7 is a view similar to FIG. 2, but of a further modification of the bus bar mount of FIG. 2.

FIG. 7 is an illustration of a further modification of the bus bar mount 12, in which each of the lid portions 20c and 22c respectively has a bent end 20g and 22g which latchably catch projections 20h and 22h formed on the outside shoulder portion of the containers 20 and 22 for latching engagement between the lid portion 20c and 22c and the container 20 and 22 proper. If desired, the bent end 20g and 22g may be formed into a lid shape, as shown, for increasing the sealing ability of the lid portions with respect to the containers proper.

Figure 8:
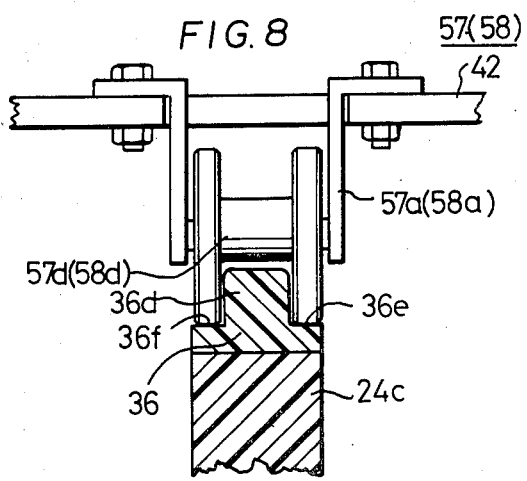
FIG. 8 is a view similar to FIG. 4, but of a modification of the guide roller unit of FIG. 4.

FIG. 8 is an illustration of a modification of the guide roller unit 57 or 58 of FIG. 4. In this modification, a roller 57d having spaced flanges (no numerals) is employed. The guide rail 36 is thus formed to have a central ridge portion 36d defining two longitudinally extending trackways 36e and 36f on either side of the ridge portion 36d. Upon mounting, the flanges of the roller 57d respectively bear upon the trackways 36e and 36f as shown.

As is shown in FIGS. 3A and 3B, protectors "P", each having a suitable longitudinal length, may be placed at either side of the bus bar mount 12, to protect the bus bar mount 12 from being damaged by other vehicles.

With the above, it will be appreciated that since the bus bar receiving slots or grooves 20b and 22b of the containers 20 and 22 are usually closed by the lid portions 20c and 22c except at the time when the current collecting equipment 12 passes, naked bus bars 32 and 34 are not being exposed to rain and/or contaminated with mud. Thus, the bus bars 32 and 34 are protected from being rusted. Further, by the presence of the lid portions 20c and 22c, troubles caused by short circuit of the two bus bars 32 and 34 are completely eliminated.

What is claimed is:

1. A current transmitting system comprising a bus bar mount assembly and a current collecting equipment which rides on said bus bar mount assembly to run along the same;
    said bus bar mount assembly including a current carrying naked cable, an elongated body of electrically insulating flexible material having a longitudinally extending groove in which said naked cable is fixedly received, an elongated lid having first and second longitudinally extending sides, said first longitudinally extending side being integrally hinged to a section of said body so as to be swingable about said section for closing and opening said groove, and latching means for establishing latching engagement between the second longitudinally extending side of said lid and said body on a side of the groove opposite from the section of the body to which the lid is hinged to sealingly close said groove when said lid is pressed against said body; and
    said current collecting equipment including a current collecting shoe adapted to contact said cable in said groove, a lid opending device for forcedly opening said lid upon movement of the opening device along said body in one direction thereby to enable said shoe to be in sliding contact with said naked cable in said groove, and a lid closing device for pressing the opened lid against said body upon movement of the closing device along said body in the one direction thereby to establish the latching engagement between said lid and said body.

2. The current transmitting system of claim 1 wherein said latching means comprises:
    a ridge formed on and along the second longitudinally extending side of said lid, said ridge having along its leading end an enlarged section; and
    a portion of said body, said portion having a groove which extends throughout the longitudinal length of said body, said groove having an enlarged section at its bottom, whereby said enlarged section of said groove snugly receives the enlarged section of said ridge when the latching engagement between said lid and said body is accomplished.

3. The current transmitting system of claim 1 wherein said latching means comprises:
    a bent end formed on and along the second longitudinally extending side of said lid; and
    a projection on and along a shoulder of said body, said bent end latchably catching said projection when said lid is pressed toward said body.

4. The current transmitting system of claim 3 wherein a leading end of said bent end is formed into a lip-shape configuration.

5. The current transmitting systme of claim 1 wherein said bus bar mount further comprises:
    an electrically insulating stand member on which said body is securedly mounted; and
    a height adjusting plate disposed between said stand member and a road surface for enabling the height of said naked cable to be adjusted relative to the road surface.

6. The current transmitting system of claim 1 wherein said current collecting shoe is positioned between said lid opening device and said lid closing device.

7. The current transmitting system of claim 6 wherein said lid opening device is a rod extending from a body portion of said current collecting equipment through said lid, and said lid closing device comprises a roller operatively connected to the body portion of said equipment to bear upon an upper surface of said lid.

8. The current transmitting system of claim 7 further including a spring for biasing said roller into contact with said lid.

9. The current transmitting system of claim 1 further comprising guide means for guiding movement of said current collecting equipment along the bus bar mount.

10. A bus bar mount assembly for supplying electric current to a current collecting shoe of an electric trackway motor vehicle comprising: a current carrying naked cable adapted to be contacted by the shoe and to supply electric current to the shoe, an elongated body of electrically insulating flexible material having a longitudinally extending groove in which said naked cable is fixedly received, an elongated lid having first and second longitudinally extending sides, said first longitudinally extending side being integrally hinged to a section of said body so as to be swingable about said section for closing and opening said groove, and latching means for establishing latching engagement between the second longitudinally extending side of said lid and said body on a side of the groove opposite from the section of the body to which the lid is hinged to sealingly close said groove when said lid is pressed against said body.

11. The mount assembly of claim 10 wherein said latching means comprises:
   a ridge formed on and along the second longitudinally extending side of said lid, said ridge having along its leading end an enlarged section; and
   a portion of said body, said portion having a groove which extends throughout the longitudinal length of said body, said groove having an enlarged section at its bottom, whereby said enlarged section of said groove snugly receives the enlarged section of said ridge when the latching engagement between said lid and said body is accomplished.

12. The mount of claim 10 wherein said latching means comprises:
   a bent end formed on and along the second longitudinally extending side of said lid; and
   a projection formed on and along a shoulder of said body, said bent end latchably catching said projection when said lid is pressed toward said body.

13. The mount of claim 12 wherein a leading end of said bent end is formed into a lip-shapd configuration.

14. The mount of claim 10 wherein said bus bar mount further comprises:
   an electrically insulating stand member on which said body is securedly mounted; and
   a height adjusting plate disposed between said stand member and a road surface for enabling the height of said naked cable to be adjusted relative to the road surface.

15. An electric current collecting mechanism on an electric trackway motor vehicle, said mechanism adapted to be supplied by current from a bus bar mount assembly as the vehicle moves along a path determined by the mount assembly, the bus bar mount assembly including a current carrying naked cable, an elongated body of electrically insulating flexible material having a longitudinally extending groove in which said naked cable is fixedly received, an elongated lid having first and second longitudinally extending sides, said longitudinally extending side being integrally hinged to a section of said body so as to be swingable about said section for closing and opening said groove, and latching means for establishing latching engagement between the second longitudinally extending side of said lid and said body on a side of the groove opposite from the section of the body to which the lid is hinged to sealingly close said groove when said lid is pressed against said body, the current collecting mechanism comprising a current collecting shoe adapted to contact said cable in said groove, a lid opening device for forcedly pivoting said lid upon movement of the opening device along said body in one direction thereby to enable said shoe to be in sliding contact with said naked cable in said groove, and a lid closing device for pressing the opened lid against said body upon movement of the closing device along said body in the one direction thereby to establish the latching engagement between said lid and said body.

16. The current collecting mechanism of claim 15 wherein said current collecting shoe is positioned between said lid opening device and said lid closing device.

17. The current collecting mechanism of claim 16 wherein said lid opening device is a rod extending from a body portion of said current collecting mechanism through said lid and said lid closing device comprises a roller operatively connected to the body portion of said mechanism to bear upon an upper surface of said lid.

18. The current collecting mechanism of claim 17 further including a spring for biasing said roller toward said lid.

19. The current collecting mechanism of claim 15 further comprising guide means for guiding movement of said current collecting equipment along the bus bar mount.

20. A system for enabling electric current to be supplied to a motor of a trackway motor vehicle from a subterranean trackway regardless of the direction of the vehicle on the trackway while minimizing damage to the trackway from environmental elements comprising:
   a trackway including an elongated naked current carrying bus bar, an elongated dielectric body including an elongated groove in which said bus bar is fixedly located, said body including a pivotable cover normally covering said groove to protect the bus bar from being attacked by environmental elements, said cover being hinged to a portion of the body extending longitudinally of one side of the groove, said body including a longitudinal slot on the other side of said groove, said cover including a longitudinal latching flange that normally mates with the longitudinal slot so the cover is normally sealed against the body to protect the bus bar,
   the vehicle including a current collecting mechanism including a current collecting shoe for engaging the bus bar and means for pivoting the cover in a first direction about the hinged portion prior to the shoe coming into contact with a particular portion of the bus bar to break the seal and open the cover and enable the shoe to contact the particular portion without engaging the cover and for pivoting the cover in a second direction about the hinged portion after the shoe has contacted the particular portion to re-establish the seal regardless of the direction of movement of the vehicle along the trackway.

21. The system of claim 20 wherein the means for pivoting includes first and second parts for respectively pivoting the cover in the first and second directions, said shoe being mounted along the trackway between the first and second parts.

22. The system of claim 20 wherein the means for pivoting includes first and second parts for respectively pivoting the cover in the first and second directions as the vehicle moves in a first direction along the trackway, and third and fourth parts for respectively pivoting the cover in the first and second directions as the vehicle moves in a second direction along the trackway, the first and fourth parts being located on one side of the shoe in a direction of vehicle travel along the trackway, the second and third parts being located on a second side of the shoe in a direction of vehicle travel along the trackway.

23. The system of claim 22 wherein the first and third parts are adjacent the shoe and the second and fourth parts are remote from the shoe, whereby the first and third parts maintain the cover in an open position and the second and fourth parts maintain the cover in a sealed condition.

24. The system of claim 23 wherein each of the first and third parts is a rod extending into the groove adjacent the portion of the body where the cover is hinged, each of the second and fourth parts is a roller biased to contact a portion of the cover adjacent the longitudinal latching flange.

25. The system of claim 24 wherein the cover includes a longitudinal groove opposite the latching flange for receiving the rollers.

26. A bus bar mount assembly for supplying electric current to a current collecting shoe of an electric trackway motor vehicle comprising an elongated naked current carrying bus bar adapted to contact the shoe and supply current to it, an elongated dielectric body including an elongated groove in which said bar is fixedly located, said body including a pivotable cover normally covering said groove to protect the bus bar from being attacked by environmental elements, said cover being hinged to a portion of the body extending longitudinally of one side of the groove, said body including a longitudinal slot on the other side of said groove, said cover including a longitudinal latching flange that normally mates with the longitudinal slot so the cover is normally sealed against the body to protect the bus bar.

27. An electric current collecting mechanism on an electric trackway motor vehicle, said mechanism adapted to be supplied by current from a bus bar mount assembly as the vehicle moves along a path determined by the mount assembly, the trackway including an elongated dielectric body including an elongated groove in which said bus bar is fixedly located, said body including a pivotable cover normally covering said groove to protect the bus bar from being attacked by environmental elements, said cover being hinged to a portion of the body extending longitudinally of one side of the groove, said body including a longitudinal slot on the other side of said groove, said cover including a longitudinal latching flange that normally mates with the longitudinal slot so the cover is normally sealed against the body to protect the bus bar, the current collecting mechanism comprising a current collecting shoe for engaging the bus bar and means for pivoting the cover in a first direction about the hinged portion prior to the shoe coming into contact with a particular portion of the bus bar to break the seal and open the cover and enable the shoe to contact the particular portion without engaging the cover and for pivoting the cover in a second direction about the hinged portion after the shoe has contacted the particular portion to re-establish the seal regardless of the direction of movement of the vehicle along the trackway.

28. The mechanism of claim 27 wherein the means for pivoting includes first and second parts for respectively pivoting the cover in the first and second directions, said shoe being mounted along the trackway between the first and second parts.

29. The mechanism of claim 27 wherein the means for pivoting includes first and second parts for respectively pivoting the cover in the first and second direction as the vehicle moves in a first direction along the trackway, and third and fourth parts for respectively pivoting the cover in the first and second directions as the vehicle moves in a second direction along the trackway, the first and fourth parts being located on one side of the shoe in a direction of vehicle travel along the trackway, the second and third parts being located on a second side of the shoe in a direction of vehicle travel along the trackway.

30. The mechanism of claim 29 wherein the first and third parts are adjacent the shoe and the second and fourth parts are remote from the shoe, whereby the first and third parts maintain the cover in an open position and the second and fourth parts maintain the cover in a sealed condition.

31. The mechanism of claim 30 wherein each of the first and third parts is a rod extending into the groove adjacent the portion of the body where the cover is hinged, each of the second and fourth parts is a roller biased to contact a portion of the cover adjacent the longitudinal latching flange.

32. The mechanism of claim 31 wherein the cover includes a longitudinal groove opposite the latching flange for receiving the rollers.

* * * * *